No. 842,074. PATENTED JAN. 22, 1907.
H. E. BRYAN.
SCRAPER FOR COOKING UTENSILS.
APPLICATION FILED MAR. 26, 1906.
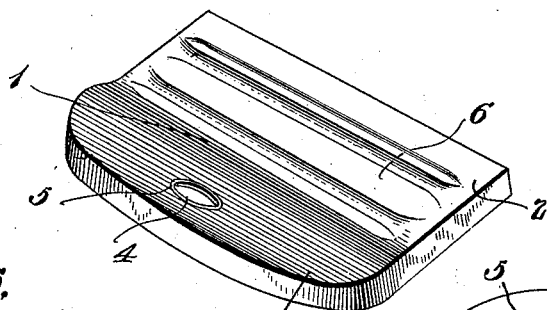
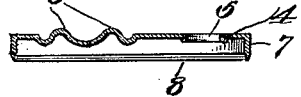
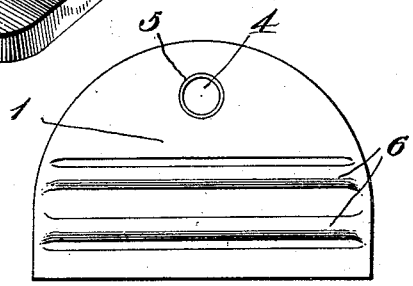
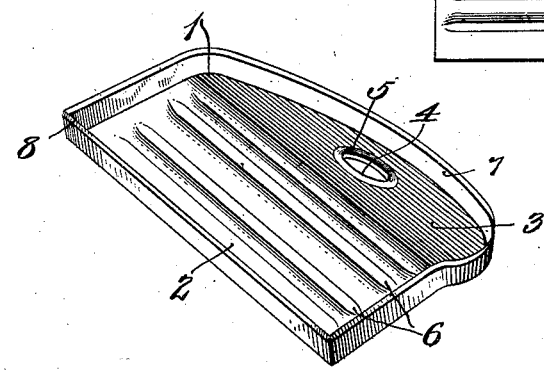
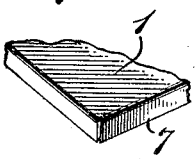
WITNESSES:
E. F. Stewart
H. S. Shepard
Harry E. Bryan,
INVENTOR.
By C. A. Snow & Co
ATTORNEYS

UNITED STATES PATENT OFFICE.

HARRY E. BRYAN, OF CADIZ, OHIO.

SCRAPER FOR COOKING UTENSILS.

No. 842,074.  Specification of Letters Patent.  Patented Jan. 22, 1907.

Application filed March 26, 1906. Serial No. 308,112.

*To all whom it may concern:*

Be it known that I, HARRY E. BRYAN, a citizen of the United States, residing at Cadiz, in the county of Harrison and State of Ohio, have invented a new and useful Scraper for Cooking Utensils, of which the following is a specification.

This invention relates to scrapers for cooking utensils, and has for its object to provide an improved device of this character which is arranged for scraping flat and concaved surfaces and is also formed to effectually fit the hand, and thereby facilitate the manipulation of the device.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a scraper of the present invention. Fig. 2 is an inverted perspective view thereof. Fig. 3 is a sectional view of the device. Fig. 4 is a detail fragmentary perspective view of one corner of the device. Fig. 5 is a plan view of a modified embodiment of the invention. Fig. 6 is a sectional view thereof.

Like characters of reference designate corresponding parts in all of the figures of the drawings.

The present device is formed from a single blank of plate metal and includes a body 1, having a flat oblong portion 2 and a segmental portion 3, which is deflected upwardly and rearwardly from the oblong portion and is provided with a centrally-located opening 4, in which a bushing 5 is snugly fitted, so as to obviate sharp edges around the walls of the opening. This opening is designed for use in hanging the device upon a hook or other support when not in use. The oblong portion 2 is longitudinally ribbed, preferably by being corrugated, as shown at 6, thereby to materially stiffen the device. The outer edge of the blank is bent downwardly to form a peripheral flange 7, extending entirely around the blank, with its free edge beveled, as at 8, to form a sharp scraping edge. As plainly shown in Fig. 3 of the drawings, it will be seen that the segmental portion 3 rises above the oblong portion, and the scraping-flange lies upon the under side of the device.

In practice either of the members 2 and 3 is grasped in the hand and the device manipulated to use the opposite flange portion for scraping a cooking utensil. The flange of the segmental portion is employed when scraping concaved surfaces, while the straight flange portions at the side and ends of the oblong member 2 are employed when scraping flat surfaces.

The fact that the parts 2 and 3 are angularly related instead of lying in the same plane enables the convenient handling of the device, for the reason that the cutting edge which is not in use is disposed away from the thumb and prevents cutting of the hand.

Figs. 5 and 6 illustrate a modified embodiment of the invention, wherein the device has the same shape as that hereinbefore described, the only difference between the two forms being that the modified form is flat or straight, while the preferred form is bent intermediate of its ends, so that its end portions are angularly related for the purpose of facilitating the handling of the device.

Having thus described the invention, what is claimed is—

1. A scraper for cooking utensils having a rectangular body portion, and a segmental body portion set at an angle thereto and provided with a scraping-flange extending entirely around the body.

2. A scraper for cooking utensils consisting of a metallic plate having a rectangular end portion and a segmental end portion, the blank being bent to dispose the end portions of the blank in angular relation, and a scraping-flange extending around the blank.

3. A scraper for cooking utensils consisting of a metallic blank having a rectangular end portion and an opposite segmental end portion, one of the end portions being corrugated, and the blank having a peripheral scraping-flange.

4. A scraper for cooking utensils comprising a metallic blank having a rectangular end portion, a segmental end portion, and a peripheral scraping-flange, one of the end portions being corrugated, and the other end portion having a suspending-eye.

5. A scraper for cooking utensils comprising a metallic plate having a rectangular end portion and an opposite segmental portion, the plate being bent along the line between the two end portions to dispose the same in angular relation, the edges of the blank being bent to form a peripheral scraping-flange, the segmental portion having an opening constituting a suspending-eye, and the rectangular portion being corrugated to stiffen the same.

In testimony that I claim the foregoing as my own I have hereto affixed my signature in the presence of two witnesses.

HARRY E. BRYAN.

Witnesses:
A. J. WALLACE,
W. C. BIGGER.